UNITED STATES PATENT OFFICE.

ERNEST FOURNEAU, OF PARIS, FRANCE.

PROCESS OF MAKING ALKAMINS.

No. 828,846.  Specification of Letters Patent.  Patented Aug. 14, 1906.

Original application filed March 21, 1904, Serial No. 199,283. Divided and this application filed June 3, 1905. Serial No. 263,636.

To all whom it may concern:

Be it known that I, ERNEST FOURNEAU, a citizen of the Republic of France, and a resident of 43 Rue de Lyon, Paris, France, have invented an Improved Process for Making Alkamins, of which the following is a specification.

The present invention relates to a process for making alkamins which contain a tertiary alcohol group and a secondary or tertiary amino group. Apart from some natural alkaloids which belong to the class of the alkamins (amino alcohols) comparatively few representatives of this class of bodies are known in the aromatic series and in the higher links of the fatty series.

In the course of his work on the constitution of morphine Knorr was led to study aminoethyl alcohol (ethanolamin) and aminopropylalcohol, (propanolamin;) but as he pursued his researches in a definite direction he did not try to obtain a series of bodies which could not interest him. Besides, he lacked a general method which would have enabled him easily to produce exactly-defined chlorhydrins, and in consequence the corresponding alkamins. Furthermore, no one had hitherto foreseen the great importance of certain alkamins from a technical standpoint. Now it was found that it was sufficient to benzoylize the alkamins hereinbefore mentioned (i. e., such which contain a tertiary alcohol group) in order to obtain analgetic (locally anesthetic) media, which act just as strongly, but less toxic (poisonous) than cocaine, and are, furthermore, easily soluble in the form of chlorhydrogen combinations (hydrochlorates) and are likewise easily sterilizable.

When it was attempted to exert locally-anesthetizing effects, reference was always had to cocaine. In this manner, for example, the eucaines were found, which, apart from tropacocaine, were hitherto alone able to stand comparison with cocaine. The essential difference which exists between the eucaines, especially eucaine beta and the compounds obtainable from the alkamins to be here represented, hardly needs special explanation here. The eucaines and tropacocaine are derivatives of pyridin, and it is well known what great influence the pyridin "Hernel" exerts on the degree of poisonousness of these bodies. Furthermore, these bodies are derivatives of secondary alcohols; but it could not be foreseen that such simple bodies—as, for instance, methyl- or dimethyl-aminobenzoyl methylpropanol, (dimethyl-amino dimethylbenzoyl carbinol,) which are derived from the tertiary butylalcohol

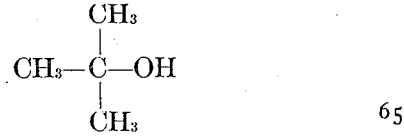

would possess qualities which had hitherto been ascribed to a number of complicated representatives of organic chemistry and which had been met in this high degree only in the derivatives of pyridin. The alkamins of the structure

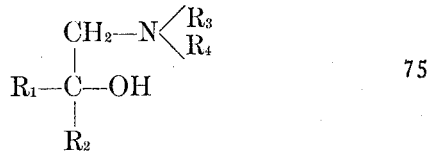

($R_1$ and $R_2$ = alkyl or aryl or aralkyl; $R_3$ and $R_4$ = alkyl or hydrogen) therefore as valuable substances possess technical importance. Furthermore, these bodies are not only all new, but they belong to a new type and form a sharply-defined class by themselves in organic chemistry. For their production dimethylamin or another desired secondary or primary amin is allowed to act on the corresponding halogenhydrins, and that according to the general method for producing alkamins. (Ladenburg B. 14, p. 1875. 2407, Wurtz, Liebig's Annalen, 121, p. 228, &c.)

The halogenhydrins can easily be obtained by Grignard's method, which was employed by Tiffeneau for chloracetone, as well as the ester of chloracetic acid. (Comptes-Rendus de l'Academie des Sciences, 1902, p. 775.)

Example: Production of methylchlormethylisoamyl-carbinol: An ether solution of an equivalent of isoamyl-magnesium bromid free from water is made, and to the same there is added drop by drop with simultaneous cooling off to twenty per cent. and steady stirring an equivalent of chloracetone, which was previously dissolved in the same quantity, by weight, of "water-free" ether. After this addition has been finished the whole is left to itself for twenty-four hours, and the product of reaction is decomposed with ice, as well as sulfuric acid. The ether solution floating on the top is drawn off, dried with sodium sulfate, and the ether distilled off. Finally, the remaining mass is fractionated. Of the halogenhydrins employed three have been described by Tiffeneau (*loco citato*)—namely, chlortrimethylcarbinol, methylchlormethylethylcarbinol, and methylchlor-methyl-phenylcarbinol; but the others, the production of which corresponds to that of methylchlormethylisoamylcarbinol, are new. These are:

1. Methylchlormethylpropylcarbinol:

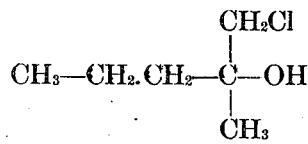

Boils at 75° under twenty-eight millimeters pressure.

2. Chlormethyldiethylcarbinol:

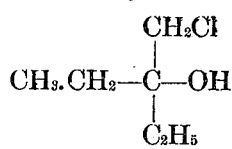

Boils at 88° under thirty-five millimeters pressure.

3. Methylchlormethylisobutylcarbinol:

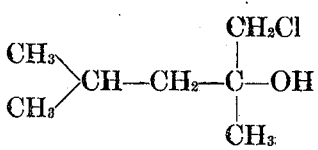

Boils at 85° under twenty-five millimeters pressure.

4. Methylchlormethylisoamylcarbinol:

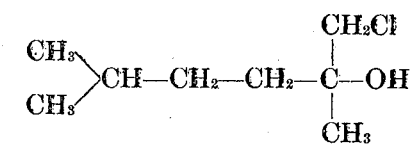

Boils at 96° to 98° under twenty-three millimeters pressure.

5. Methylchlormethylbenzylcarbinol:

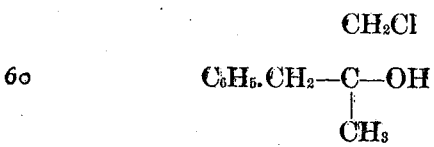

Boils at 155° under twenty-five millimeters pressure.

Some of these chlorhydrins turn black very rapidly in the air, others, on the other hand, but very slowly. In order to produce the corresponding alkamins from the halogenhydrins, it is sufficient to heat the latter with monomethylamin, dimethylamin, or any other primary or secondary base in the presence of benzol or alcohol as a solvent.

Example I: Production of dimethylaminomethyldiethylcarbinol:

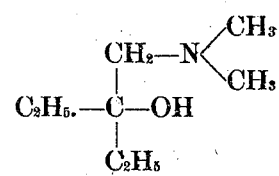

A molecule of chlorhydrin (chlormethyldiethylcarbinol) boiling at 88° under thirty-five millimeters pressure is heated in the "pressure-boiler" for a day at about 130°, with more than two molecules of dimethylamin dissolved in a suitable solvent. The product of reaction is distilled off at normal pressure in order to remove the largest part of the solvent, as well as the dimethylamin, which has not entered into reaction. The remaining mass is then subjected with rarefication of air to a fractionated distillation, or according to a method which takes more time, but yields a purer product, the mass of reaction is treated with diluted muriatic acid in order to bring the base in solution. The acid reacting solution is repeatedly shaken with benzol (which takes up the neutral substance, as well as the chlorhydrin which has not entered into reaction) and almost completely distilled. The remaining mass is mixed with carbonate of soda and thereupon extracted with benzol or ether. The solution, dried with heated carbonate of potassium, is evaporated, and finally the remaining mass is subjected with rarefaction of air or ordinary atmospheric pressure to a fractional distillation. The yield is eighty per cent. on the average. The base obtained boils at 76° to 79° under twenty-three millimeters pressure. It consists of an almost wholly colorless liquid of slight odor which is very soluble in water and yields salts difficult to crystallize. A characteristic is the chlorhydrogen compound (hydrochlorate) of the benzoylized derivative, which crystallizes out of alcohol in beautiful and shining tablets, which melt at about 189°. All other alkamins cited in the present application have been obtained in similar manner. If you proceed from the iodin hydrin, a heating is not necessary.

II. Dimethylaminotrimethylcarbinol:

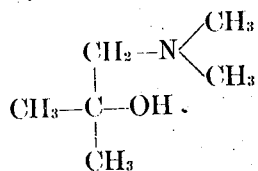

The chlorhydrin, (chlortrimethylcarbinol:)

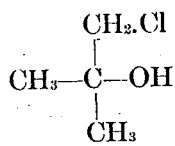

(Krassusky, *Journal de la Société Physico-Chimique russe*, second series, Vol. 32, p. 84—Tiffeneau, *loco citato*,) boils at 127° to 129° and normal atmospheric pressure. The corresponding base, obtained by the action of dimethylamin on the chlorhydrin of Krassusky, boils at 60° under forty-eight millimeters pressure. Its properties are the same as those of the base before described. The chlorhydrogen compound of its benzoylized derivative crystallizes out of alcoholic solutions in large cubes, which decompose in the air and melt at 202°.

III. Dimethylaminodimethylethylcarbinol:

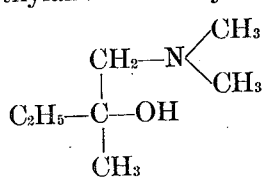

Obtained by the action of dimethylamin on the corresponding chlorhydrin (methylchlormethylethylcarbinol,) (Tiffeneau, *loco citato*,) which boils at 150°. This base consists of a liquid which boils at 57° under twenty-three millimeters pressure. This liquid is almost entirely colorless, very easily soluble in all solvents, and more easily soluble in cold than in warm water. The majority of its salts are difficult to crystallize. The platinum salt is very soluble in water. The gold salt crystallizes in little leaves, easily decomposable, and which are but slightly soluble in water. The chlorhydrogen compound of the benzoylized derivative crystallizes in very small crystals out of saturated solutions in absolute ethyl alcohol. It melts at 175°.

IV. Dimethylaminodimethylpropylcarbinol:

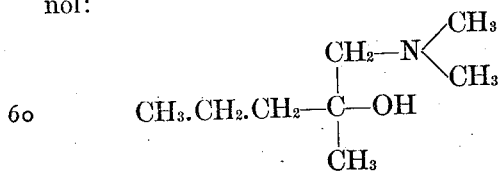

The corresponding chlorhydrin (methylchlormethylpropylcarbinol) boils at 75° under twenty-eight millimeters pressure. The base is very soluble in water, boils at 78° under thirty-five millimeters pressure. Furthermore, its salts are uncrystallizable. The chlorhydrate of the benzoylized derivative melts at 146° and crystallizes in fine needles very easily soluble in water and alcohol, which needles are precipitated by ether out of the alcoholic solution. This body is hygroscopic.

V. Dimethylaminodimethylisobutylcarbinol:

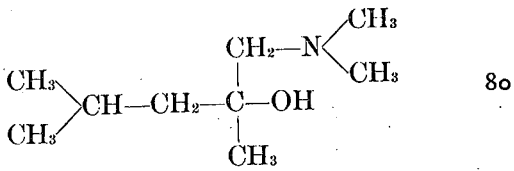

The chlorhydrin (methylchlormethylisobutylcarbinol) boils at 85° under twenty-five millimeters pressure. The base, on the other hand, at +82° under thirty-four millimeters pressure. The chlorhydrate of the benzoylized derivative melts at 134°. This body is easily soluble in alcohol and water, but insoluble, on the other hand, in ether.

VI. Dimethylaminodimethylisoamylcarbinol: The chlorhydrin (methylchlormethylisoamylcarbinol) boils at 96° to 98° under twenty-three millimeters pressure; the base, on the other hand, at 98° to 99° under twenty-four millimeters pressure. The body possesses a strong odor and is but very slightly soluble in water. Furthermore, it colors very soon under the influence of the air. The chlorhydrate of its benzoylized derivative crystallizes out of a mixture of ether alcohol in beautiful silk-like needles, which are very easily soluble in alcohol, soluble with much difficulty in ether, and melt at 138°.

VII. Methylaminodimethylphenylcarbinol is obtained by doubly decomposing methylamin with methylchlor- or methyliodin- methylphenylcarbinol:

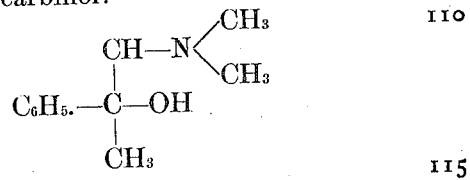

The corresponding halogenhydrins (methylhalogenmethylphenylcarbinols) have been described by Tiffeneau. The base, which boils at 135° to 138° under thirty-one millimeters pressure, is very slightly soluble in cold water, and almost entirely insoluble in boiling water. The chlorhydrate precipitated out of acetone has the form of fine little leaves and melts at 153°. The dibenzoyl derivate melts at 122° and crystallizes out of petroleum ether in beautiful octahedral, shining, and hard crystals.

If the methylamin in the preceding example is replaced by dimethylamin, there is obtained—

VIII. Dimethylaminodimethylphenylcarbinol:

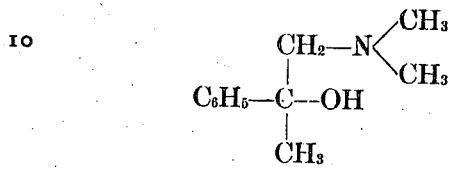

The base boils at 135° to 136° under thirty-two millimeters pressure. The chlorhydrate crystallizes out of acetone in small leaves which melt at 159° to 160°. The chlorhydrate of the benzoyl derivative is very little soluble in alcohol and in water, but very easily soluble, on the other hand, in warm methyl alcohol and crystallizes out of the same after cooling in beautiful shining little tablets, which melt at 205° to 206°.

IX. Diethylaminodimethylphenylcarbinol:

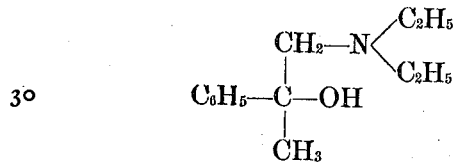

is obtained by allowing diethylamin, in place of dimethylamin, (see Example 8,) to act upon the corresponding halogenhydrin. This body represents a thick liquid which boils at 147° to 149° under twenty-four millimeters pressure. The salts are crystallizable with great difficulty. The chlorhydrate of the benzoylized derivative of this product is syrupy.

X. Dimethylaminodimethylbenzylcarbinol:

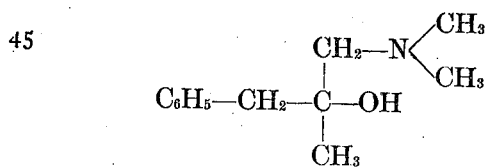

The chlorhydrin, which is obtained by permitting benzyl magnesium chlorid to act upon chloracetone, boils at 155° under twenty-five millimeters pressure. The base boils at 144° under twenty-four millimeters pressure. The chlorhydrate of the benzoyl derivative crystallizes out of absolute alcohol in very fine needles and out of methyl alcohol in beautiful, transparent, and hard prisms, which melt at 195°.

The following may be cited as examples for the production of alkamins from the corresponding bromid- or iodin- hydrins:

XI. Bromiddimethylisomylcarbinol:

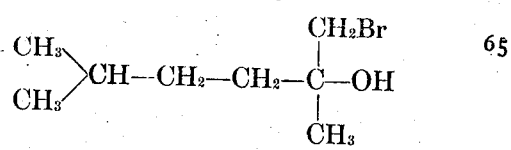

This body is easily obtained by treating the corresponding ethylene oxid (which results from the action of caustic potash on the chlordimethylisomylcarbinol described in the application) with ethylmagnesium bromid. This reaction is identical with that which is yielded by the bromidhydrin of glycol when you proceed from ethylenoxid, (Blaise, *Comptes-Rendus de l' Ac. d. Sci.* 134, *p.* 551.) This bromid hydrin boils at 130° under thirty - seven millimeters pressure. Ten gr. of the bromidhydrin are heated for one day at 100° with double the theoretical quantity of dimethylamin in a thirty-per-cent. benzol solution in a tube sealed by melting or otherwise closed. The base is isolated exactly as it was done with the chlorhydrin. In this manner there are obtained 4.8 g. of the dimethylaminodimethylisoamylcarbinol already described in Example VI and the chlorhydrate of which melts at 142° and crystallizes out of an alcohol-ether mixture in fine hygroscopic little leaves.

XII. Iodindimethylphenylcarbinol:

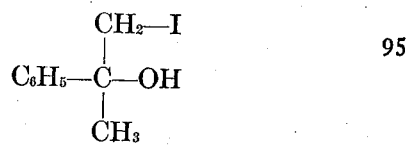

This iodinhydrin was produced by Tiffeneau (*C. R. de l' Ac. d. Sc.* 134, p. 847) by the action of subiodic acid (Lipmann, *C. R. de l'Ac. d. Sc.* 63, p. 68) upon methethenylphen. Seventy g. of the iodinhydrin are treated at ordinary temperature with twice the theoretical quantity of dimethylamin in a thirty - per - cent. benzoyl solution. After three days the dimethylaminiodinhydrate which has been formed is thrown out and the base is isolated exactly like the one which is derived from the corresponding chlorhydrin, (Example VIII.) In this manner there are obtained about twenty-two g. dimethylaminodimethylphenylcarbinol, the properties of which have already been recounted in the description.

I claim as my invention—

1. The process for producing aminoalcohols of the formula substantially as herein described:

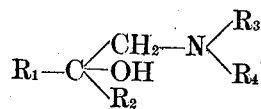

said process consisting in reacting on halogenhydrins of the structure

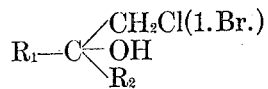

with aliphatic-amins.

2. The process for producing aminoalcohols of the formula substantially as herein described

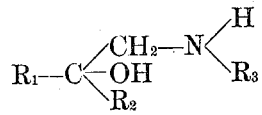

said process consisting in reacting on halogenhydrins of the structure

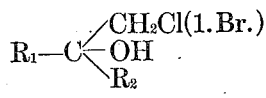

with primary aliphatic-amins.

In testimony whereof I have signed my name to this specification in the presence of two subscribing witnesses.

ERNEST FOURNEAU.

Witnesses:
 ANTONIN MONTEILHET,
 HANSON C. COXE.